(12) United States Patent
Gayheart et al.

(10) Patent No.: US 9,097,158 B2
(45) Date of Patent: Aug. 4, 2015

(54) SOLIDS TRANSPORT IN FLUE GAS DESULFURIZATION SYSTEM

(71) Applicant: Babcock & Wilcox Power Generation Group, Inc., Barberton, OH (US)

(72) Inventors: Jeb W Gayheart, Streetsboro, OH (US); Douglas R Lorenz, Uniontown, OH (US); James M MacInnis, Copley, OH (US); Eric S Miller, Fairlawn, OH (US); Jonathan C Roth, Copley, OH (US)

( * ) Notice: Subject to any disclaimer, the term of this patent is extended or adjusted under 35 U.S.C. 154(b) by 0 days.

(21) Appl. No.: 14/219,586

(22) Filed: Mar. 19, 2014

(65) Prior Publication Data

US 2014/0338531 A1    Nov. 20, 2014

Related U.S. Application Data

(63) Continuation of application No. 13/895,642, filed on May 16, 2013, now Pat. No. 8,715,600.

(51) Int. Cl.
| | |
|---|---|
| *B01D 53/83* | (2006.01) |
| *B01D 53/06* | (2006.01) |
| *F01N 3/08* | (2006.01) |
| *B01D 53/50* | (2006.01) |
| *F23J 15/00* | (2006.01) |

(52) U.S. Cl.
CPC .............. *F01N 3/0885* (2013.01); *B01D 53/06* (2013.01); *B01D 53/508* (2013.01); *B01D 53/83* (2013.01); *F23J 15/003* (2013.01); *B01D 2251/404* (2013.01); *B01D 2253/102* (2013.01); *B01D 2257/2045* (2013.01); *B01D 2258/0283* (2013.01); *F23J 2215/20* (2013.01); *F23J 2217/101* (2013.01); *F23J 2217/102* (2013.01); *F23J 2219/60* (2013.01)

(58) Field of Classification Search
CPC ................................ B01D 53/06; B01D 53/86
USPC ........ 226/7, 97.1; 423/215.5, 244.08, 244.07, 423/210; 422/168, 177
See application file for complete search history.

(56) References Cited

U.S. PATENT DOCUMENTS

| 4,548,797 A | 10/1985 | Sauer et al. |
| 4,726,940 A | 2/1988 | Kobayashi |

(Continued)

FOREIGN PATENT DOCUMENTS

| GB | 2271560 A | 4/1994 | |
| JP | 3-207430 A | * 9/1991 | ............. 422/168 |

(Continued)

OTHER PUBLICATIONS

Fuller Airslide Conveying Technology Product Brochure (FLSmidth 2009), retrieved from http://www.flsmidth.com/~/media/PDF%20Files/Material%20Handling/Pneumatic%20Transport/AirslideConveyingSystem_broch.ashx.

(Continued)

*Primary Examiner* — Timothy Vanoy
(74) *Attorney, Agent, or Firm* — Eric Marich (57) ABSTRACT

A solids transport system for use in a flue gas desulfurization system is disclosed. Flue gas can be recycled from downstream and used as a fluidizing gas for transporting solids between different locations. Exemplary systems include fluidization slide gravity conveyors, fluidization pads in bins, and in hoppers. The flue gas is generally already at an elevated temperature, reducing power consumption needed to heat the fluidizing gas.

35 Claims, 6 Drawing Sheets

(56) References Cited

U.S. PATENT DOCUMENTS

| | | |
|---|---|---|
| 5,092,929 A | 3/1992 | Sauer et al. |
| 5,273,721 A | 12/1993 | Hallstrom |
| 5,814,288 A | 9/1998 | Madden et al. |
| 5,993,765 A | 11/1999 | Beisswenger et al. |
| 7,641,876 B2 | 1/2010 | Barger et al. |
| 7,850,936 B2 | 12/2010 | Levasseur et al. |
| 8,518,353 B1 * | 8/2013 | Neathery et al. ............. 423/210 |
| 8,715,600 B1 | 5/2014 | Gayheart |
| 2005/0084434 A1 | 4/2005 | Cox et al. |
| 2011/0083592 A1 | 4/2011 | McDonald et al. |
| 2011/0303133 A1 | 12/2011 | Nijhawan |
| 2013/0294992 A1 | 11/2013 | Fiedler |

FOREIGN PATENT DOCUMENTS

| | | |
|---|---|---|
| WO | 1983001941 A1 | 6/1983 |
| WO | 2013049036 A1 | 4/2013 |

OTHER PUBLICATIONS

PCT Search Report dated Sep. 15, 2014 for related PCT Application No. PCT/US2014/038030.

* cited by examiner

SOLIDS TRANSPORT IN FLUE GAS DESULFURIZATION SYSTEM

RELATED APPLICATION DATA

This patent application claims priority to and is a continuation-in-part of U.S. patent application Ser. No. 13/895,642 filed May 16, 2013, which issued as U.S. Pat. No. 8,715,600 on May 6, 2014 and is titled "Circulating Dry Scrubber." The complete text of that patent application is hereby incorporated by reference as though fully set forth herein in its entirety.

BACKGROUND

The present disclosure relates to a solids transport system that can be used in a flue gas desulfurization system, particularly one using a dry scrubber structure (e.g., a circulating dry scrubber (CDS) or novel integrated desulfurization scrubber (NIDS)). Dry powders or particles are transported using fluidized surfaces, and recycled hot flue gas is used as the fluidizing gas for such surfaces. This permits heating components to be reduced in size or fewer in number, reducing capital costs and operating costs.

During combustion, the chemical energy in a fuel is converted to thermal heat, which can be used in various forms for different applications. The fuels used in the combustion process can include a wide range of solid, liquid, and gaseous substances, including coal, oil (diesel, No. 2, Bunker C or No. 6), natural gas, wood, tires, biomass, etc.

Combustion transforms the fuel into a large number of chemical compounds. Water ($H_2O$) and carbon dioxide ($CO_2$) are the primary products of complete combustion. However, other combustion reactions with chemical components in the fuel result in undesirable byproducts. Depending on the fuel used, such byproducts may include particulates (e.g., fly ash), acid gases such as sulfur oxides ($SO_x$) or nitric oxides ($NO_x$), metals such as mercury or arsenic, carbon monoxide (CO), and hydrocarbons (HC). The emissions levels of many of these byproducts are regulated by governmental entities, such as the U.S. Environmental Protection Agency (EPA).

Several different technologies exist for removing such byproducts from the flue gas. In one method, known as spray drying chemical absorption or dry scrubbing, an aqueous alkaline solution or slurry, which has been finely atomized, is sprayed into the hot flue gas downstream of the combustion chamber in which the fuel was combusted. The alkaline reagent reacts with the pollutants, and particulates are formed. The water evaporates and cools the hot flue gas. The exiting cleaned flue gas typically has a moisture content of about 10% to about 15%. The flue gas then travels to a particulate collection device, generally a baghouse, where the particulates are removed from the flue gas, which is then sent to a stack.

In a flue gas desulfurization (FGD) system, particularly one including a circulating dry scrubber (CDS), the solid particles captured in the particulate collection device are usually recycled back to the dry scrubber to improve reaction efficiency. The particles typically travel back to the dry scrubber over fluidized surfaces. Heated, pressurized ambient air is generally used as the fluidizing gas. The air is commonly pressurized using a fan/blower, and heated using an electric resistance heater. These heaters consumer enormous amounts of power, on the order of hundreds of kilowatts. The heating elements add significant capital costs and operating costs to the overall system. It would be desirable to provide alternative CDS-FGD systems that can reduce such costs as well as improve or maintain combustion byproduct removal.

BRIEF DESCRIPTION

Disclosed herein are various systems and methods for reducing $SO_x$ emissions using a dry scrubber for desulfurization of the flue gas. Solid particles are captured from the flue gas and then recycled to the dry scrubber using a solids transport system that includes one or more fluidized surfaces upon which the solid particles travel. Hot flue gas is used as the fluidizing gas, rather than ambient air. This permits reduced capital and operating costs which are usually associated with heaters needed to heat the fluidizing gas.

Disclosed in various embodiments is a flue gas desulfurization system, comprising: a main flue gas path that extends through an absorber vessel (e.g., a CDS absorber vessel), a particle collection device downstream of the absorber vessel, and a stack; a solids transport system for recycling solid particles from the particle collection device to the absorber vessel, the solids transport system including at least one fluidized surface; and a flue gas recycle path having at least one take-off point that sends flue gas from the main flue gas path to the solids transport system, the flue gas being used as a fluidizing gas to produce the at least one fluidized surface.

Hot flue gas is bled off of the main flue gas path from a take-off point into the flue gas recycle path. The take-off point can be located upstream of an air heater in the main flue gas path; upstream of the absorber vessel in the main flue gas path; or located downstream of the absorber vessel and upstream of the particle collection device in the main flue gas path.

Sometimes, the main flue gas path includes a fan downstream of the particle collection device and upstream of the stack. The take-off point can be located downstream of the particle collection device and upstream of the fan in the main flue gas path; or located downstream of the fan and upstream of the stack in the main flue gas path.

In some other embodiments, the main flue gas path includes an air preheater that is downstream of a boiler and upstream of the absorber vessel, and the flue gas recycle path has a take-off point located upstream of the air preheater.

The solids transport system may include a slide leading from the particle collection device, the slide having the at least one fluidized surface. The solids transport system may include a distribution bin that receives recycled solid particles from the particle collection device, the at least one fluidized surface being located in the distribution bin. In particular embodiments, the solids transport system includes a slide leading from the particle collection device to a distribution bin, the slide and the distribution bin each having a fluidized surface. Sometimes, the solids transport system includes a hopper, the hopper having a fluidized surface The particle collection device used in the flue gas desulfurization system may be a pulse jet fabric filter, a shake deflate fabric filter, a reverse gas fabric filter, or an electrostatic precipitator.

The system can further comprise an air stream that is mixed with the flue gas recycle path, so that a mixture of flue gas and air is used as the fluidizing gas.

Also disclosed are methods for recycling solid particles in a flue gas desulfurization system that has a main flue gas path extending through an absorber vessel and a particle collection device downstream of the absorber vessel, comprising: separating solid particles from clean gas in the particle collection device; recycling solid particles from the particle collection device to the absorber vessel using a solids transport system that includes at least one fluidized surface; wherein recycled flue gas is sent from the main flue gas path to the solids transport system through a flue gas recycle path having at least one take-off point, and the recycled flue gas is used as a fluidizing gas to produce the at least one fluidized surface upon which the solid particles travel. Sometimes, the recycled flue gas is mixed with air to form a mixture of flue gas and air that is used as the fluidizing gas.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any impurities that might result therefrom, and excludes other components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

It should be noted that some terms used herein are relative terms. The terms "inlet" and "outlet" are relative to a fluid flowing through them with respect to a given structure, e.g., a fluid flows through the inlet into the structure and flows through the outlet out of the structure. The terms "upstream" and "downstream" are relative to the direction in which a fluid flows through various components, i.e. the fluid flows through an upstream component prior to flowing through the downstream component. It should be noted that in a loop, a first component can be described as being both upstream of and downstream of a second component.

The terms "top" and "bottom" or "base" are used to refer to locations/surfaces where the top is always higher than the bottom/base relative to an absolute reference, i.e. the surface of the earth. The terms "upwards" and "downwards" are also relative to an absolute reference; an upwards flow is always against the gravity of the earth.

The term "hydrated lime" refers to calcium hydroxide, also known as $Ca(OH)_2$. The term "hydrated" when used here does not mean that molecular water is present. The term "lime slurry" is used to refer to a mixture of calcium hydroxide with water. Other calcium sorbents include, for example, limestone or quicklime. The term "limestone" refers to calcium carbonate, also known as $CaCO_3$. The term "quicklime" refers to calcium oxide, CaO.

The term "plane" is used herein to refer generally to a common level, and should be construed as referring to a flat volume, not as a flat surface.

The term "directly," when used to refer to two system components, means that no significant system components are in the path between the two named components. However, minor components, such as valves or pumps or other control devices, or sensors (e.g., temperature or pressure), may be located in the path between the two named components.

The terms "particles" and "powder" are used interchangeably herein, and should be considered as being synonymous.

To the extent that explanations of certain terminology or principles of the boiler and/or steam generator arts may be necessary to understand the present disclosure, the reader is referred to *Steam/its generation and use,* 40th Edition, Stultz and Kitto, Eds., Copyright 1992, The Babcock & Wilcox Company, and to *Steam/its generation and use,* 41st Edition, Kitto and Stultz, Eds., Copyright 2005, The Babcock & Wilcox Company, the texts of which are hereby incorporated by reference as though fully set forth herein.

The present disclosure relates to various methods and systems for reducing the costs associated with operating a pollution control system using a dry scrubber (e.g., a CDS from The Babcock & Wilcox Company, or a NIDS such as that from Alstom) for desulfurization. The pollution control system is used to capture pollutants in flue gas. Very generally, dry calcium hydroxide powder (i.e. hydrated lime), quicklime, or other reagent is injected into the flue gas along with a solids recirculation stream to capture pollutants such as $SO_x$, with an absorber vessel providing space for reaction between the reagent, the water, and the flue gas. The resulting flue gas, now containing solid particles and clean gas, passes through a downstream particle collection device (e.g., baghouse) to separate the solid particles from the clean gas. The solid particles are then recycled back to the absorber vessel using a solids transport system.

The solids transport system typically includes fluidized slide conveyors, bins using fluidized pads, and fluidized hoppers associated with the particle collection device. These components generally include a fabric, stone, or mesh surface through which a fluidizing gas (e.g. air) passes to fluidize the solid powder. In the case of fluidized slide conveyors, fluidization allows the powder to flow through the conveyor in the direction of gravity. In the case of bin fluidized pads, fluidization assists the gravity flow of material out of the bin. The fabric, stone, or mesh surface serves to support the powder and prevent it from entering the fluidizing system.

The fluidizing gas is heated to ensure that its water vapor component does not condense onto the particles, which can lead to cohesion and difficulty in flow. Heating of the air also heats the powder, preventing the condensation of water vapor from external sources onto the powder. The fluidizing gas should be heated above the water dew point.

In the systems of the present disclosure, the solid particles being recycled back to the absorber vessel are fluidized using hot flue gas instead of heated ambient air. Because the flue gas is already hot, the power required to heat the fluidizing gas is reduced. This also lowers capital costs and operating costs by reducing the number of heaters needed or by reducing their size.

Generally, it is considered that the flue gas desulfurization systems and methods disclosed herein can be used in combination with any combustion system. The combustion can be used for any purpose, for example to generate power, produce a certain product, or simply to incinerate a given fuel. Exemplary combustion systems in which the present methods may be applicable include power generation systems that use a boiler having a furnace as the combustion chamber; cement kilns; electric arc furnaces; glass furnaces; smelters (copper, gold, tin, etc.); pelletizer roasters; blast furnaces; coke oven batteries; chemical fired heaters; refinery ovens; and incinerators (medical waste, municipal solid waste, etc.). The term "combustion chamber" is used herein to refer to the specific structure within the system in which combustion occurs.

Figure 1:
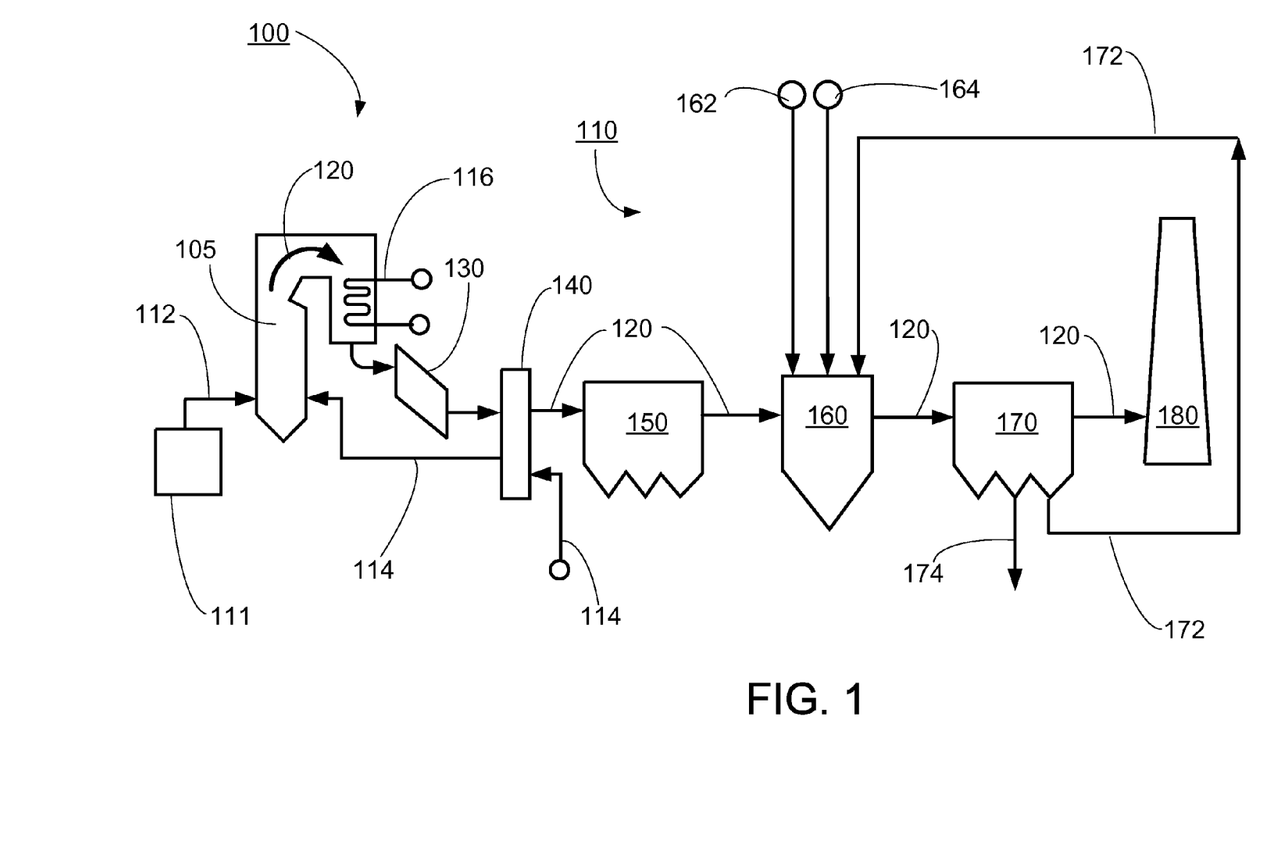
FIG. 1 is a diagram illustrating the components and flow paths of a boiler with a dry desulfurization system.

FIG. 1 generally illustrates an exemplary power generation system with a boiler 100 and a downstream desulfurization system 110. A fossil fuel 112, such as coal from a pulverizer 111, and air 114 are burned in the furnace 105, resulting in the generation of a flue gas 120. The flue gas 120 passes an economizer 116 used to preheat the water used in the boiler to produce steam and to cool the flue gas 120. Other heat transfer surfaces upstream of the economizer 116 are not shown. The flue gas 120 then enters a selective catalytic reduction (SCR) system 130, which may or may not be present, to remove nitrogen oxides ($NO_x$) from the flue gas 120. Next, the flue gas 120 passes through an air preheater 140 to further cool the flue gas 120 and heat the air 114 entering the furnace 105. After passing through the air preheater 140, the flue gas 120 typically has a temperature of about 250 to about 400° F. (121 to 204° C.). Sometimes the flue gas 120 then passes through a particulate collection device 150 to collect fly ash and other large particles. The flue gas continues into a dry scrubber 160. Here, hydrated lime or quicklime 162 and water 164 are injected into the flue gas to react with sulfur oxides ($SO_x$) and to further cool the flue gas 120 to a range of about 140 to about 210° F. (60 to 99° C.). Separate injection of hydrated lime or quicklime and water permits easy adjustment of the lime feed for variable $SO_x$ concentrations and permits the use of lower-quality water. In the absorber vessel 160, the water is evaporated, and the resulting cleaned and particle-laden flue gas 120 is conveyed to a particle collection device (e.g., baghouse) 170, such as a fabric filter or an electrostatic precipitator, to remove the particles from the flue gas 120. The cleaned flue gas 120 is then sent to a stack 180.

A recycle stream 172 from the baghouse 170 is typically used to collect the solid alkaline particles and recycle them from the baghouse back to the dry scrubber 160. This recirculation gives unreacted reagent multiple opportunities to pass through the dry scrubber absorber vessel 160 and react with sulfur oxides, leading to high reagent utilization. Fresh hydrated lime or quicklime 162 can be added as well to replace the used hydrated lime. Particles can also be removed from the baghouse 170 and disposed of, indicated here with reference numeral 174.

Figure 2:
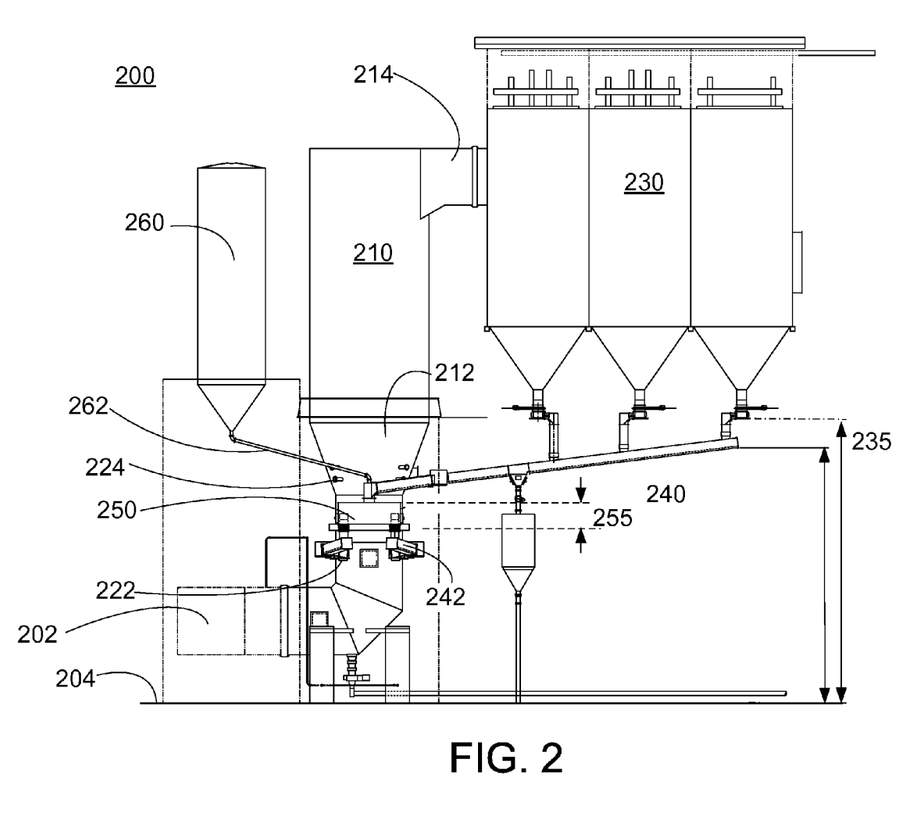
FIG. 2 is a side view illustrating the CDS absorber vessel and the particle collection device of the desulfurization system, along with the solids transport system.
Figure 3:
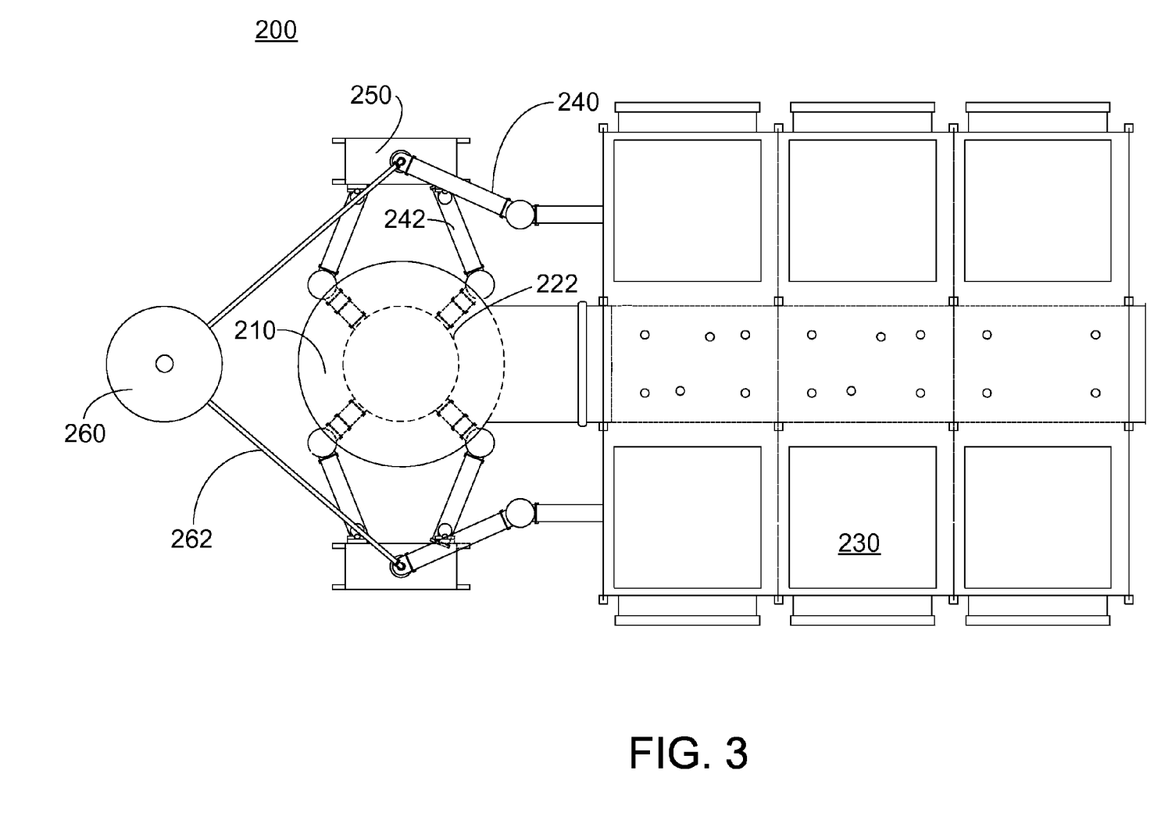
FIG. 3 is a plan (top) view of the system of FIG. 2.
Figure 4:
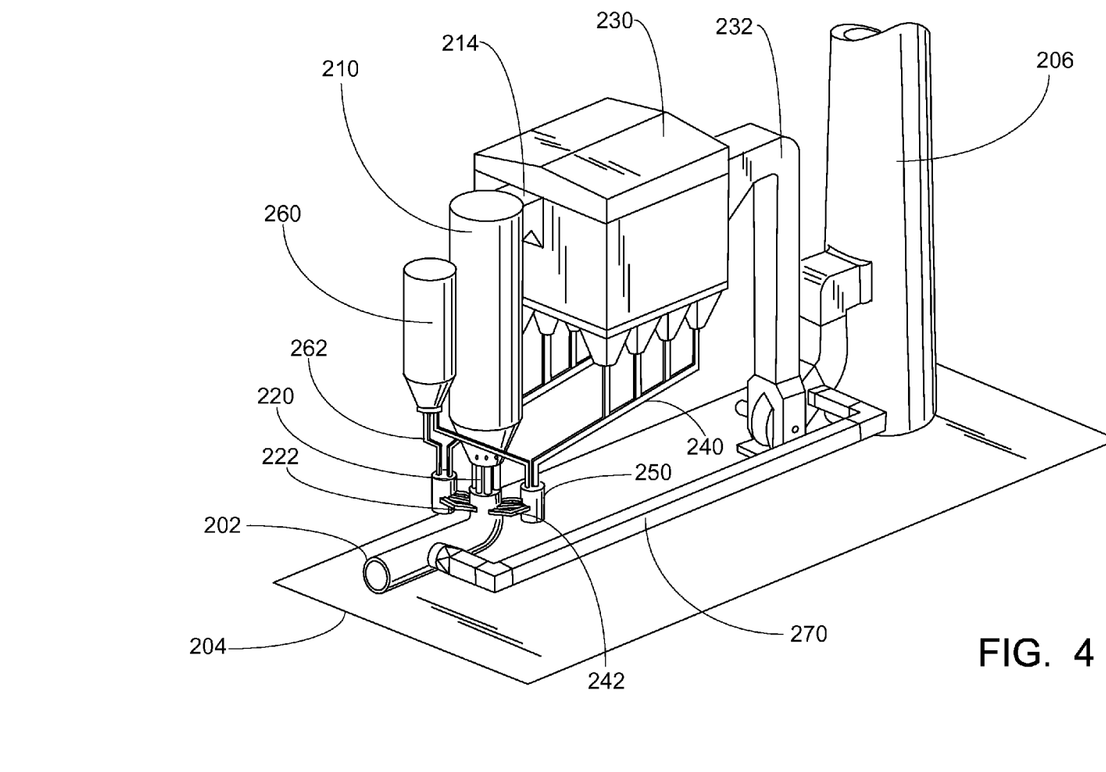
FIG. 4 is a perspective view of the system of FIG. 2.

FIG. 2 and FIG. 3 provide some additional detail of a solids transport system 200 used to return solid particles back to the absorber vessel. FIG. 2 is a side view, and FIG. 3 is a plan view (i.e. from the top). FIG. 4 is a perspective view of a similar system.

Referring initially to FIG. 2, untreated flue gas enters the pollution control system from the left side through channel 202, which is at a low elevation relative to grade 204. The channel then turns vertically so that the flue gas flows upwards through Venturis 220 (see FIG. 4) into a bottom inlet 212 of the circulating dry scrubber (CDS) absorber vessel 210. As the flue gas flows upwards, the flue gas passes through solids injection points 222 which are upstream or downstream of the Venturis 220. This illustration, as seen in FIG. 3, shows four Venturis. Water injection points 224 are located at the base of the absorber vessel 210 and downstream of the Venturis 220. Solid particles and cleaned gas then flow from a top outlet 214 of the absorber vessel into the baghouse 230. The baghouse 230 may be elevated a certain height 235 above grade 204.

Next, the solid particles are removed from the gas stream, and some of the solid particles are recirculated back from the baghouse to the absorber vessel. The solid particles exit the baghouse 230 through fluidized hoppers onto a fluidized slide 240. One or two or more slides can be used, depending on the size and the arrangement of the baghouse. In the present disclosure, the surface of the slide is fluidized using hot flue gas.

The solid particles may then need to be split approximately evenly onto a second set of slides equal to the number of solids injection points. As illustrated in this particular arrangement, a distribution box 250 may be used for this purpose. The slides 240 lead from the baghouse 230 to the distribution box 250. Here, two distribution boxes are shown. The distribution box divides the solid particle flow from the baghouse into two different streams, which then travel down another fluidized slide 242 to a solids injection point 222. In FIG. 3 there are four solids injection points, while in in FIG.

4, there are six solids injection points, one for each Venturi 220, evenly spaced around the absorber vessel 210. However, the number of injection points need not equal the number of Venturis. In some embodiments, each slide has a minimum slope of seven (7) degrees to achieve flow. The distribution box 250 may have a height 255 of about 8 feet to about 15 feet. It should be noted that as seen in FIG. 3, the distribution boxes are located to the sides of the absorber vessel, not underneath the absorber vessel, i.e. the distribution box does not affect the height of the absorber vessel. The base of the distribution bin also includes a fluidized surface, which aids in distribution of the solid particles.

A hydrated lime or fresh quicklime silo 260 has a channel 262 leading from the hydrated lime silo to each distribution box 250. As seen in FIG. 4, fresh hydrated lime is injected into the distribution box 250, or alternatively into the CDS absorber vessel 210 (not shown), or alternatively into the channel 202 upstream of the CDS absorber vessel (not shown). The distribution box also mixes the solid particles with the fresh hydrated lime. Generally, the fresh hydrated lime silo 260 is elevated above the injection point so that at least a 15° slope can be achieved from the silo to the injection point, permitting fresh hydrated lime to be fed by gravity. The channel 262 can also be considered a fluidized slide conveyor.

Referring still to FIG. 4, the clean gas exits the baghouse 230 through duct 232 to a stack 206 downstream of the baghouse, from which the clean gas can be vented to atmosphere. A clean gas recirculation flue 270 is also seen, which recycles clean flue gas from downstream of the baghouse 230 to a point upstream of the solids injection point 222.

It is noted that FIGS. 2-4 present one exemplary embodiment of a desulfurization system and a solids transport system, and variations are contemplated as being within the scope of this disclosure. For example, a distribution box does not need to be used. Any number of solids injection points could be used to inject solids from the filter outlet directly into the absorber vessel. The injection points can be upstream or downstream of the Venturis. The hydrated lime/quicklime may also be introduced via a variety of conveyor types into the main flue gas path anywhere upstream of the CDS absorber vessel or anywhere in the recycle solids stream, generally downstream of any location where the solid particles are removed or purged from the system. While a CDS absorber vessel is depicted here as having a large cylindrical shape for permitting reaction between pollutants in the flue gas and the solid particles, it is generally contemplated that any structure or duct length sufficient to permit reaction may be used. For example, using a square-shaped duct is contemplated.

Figure 5:
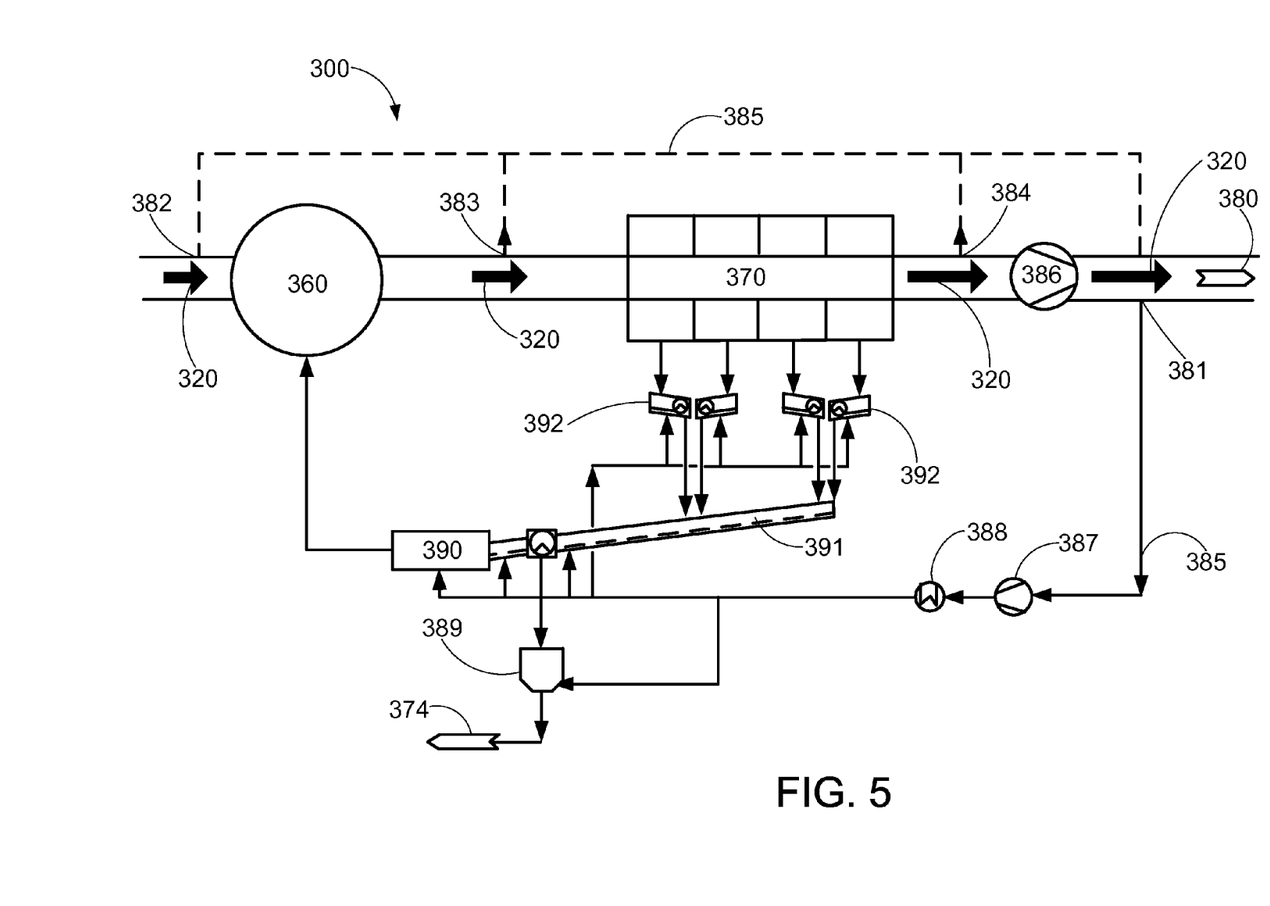
FIG. 5 is a diagram illustrating the various flow paths of the desulfurization system in one exemplary embodiment of the present disclosure. A main flue gas path is illustrated between device components including the CDS absorber vessel and the particle collection device/particulate collection device. A flue gas recycle path runs to the solids transport system which recycles solid particles from the particle collection device back to the CDS absorber vessel.

FIG. 5 is a schematic illustrating the flue gas desulfurization system 300 of some embodiments of the present disclosure and its solids transport system. The system includes a main flue gas path 320 that extends through a circulating dry scrubber 360, a particle collection device 370, and to a stack 380 for discharge. A fan (e.g., an induced draft fan) 386 can also be located in the main flue gas path, for example downstream of the particle collection device 370 and upstream of the stack 380.

A recycle flue gas path 385 is also illustrated. A portion of the flue gas in the main flue gas path 320 is bled off at one or more take-off points 381, 382, 383, 384, and is sent to the solids transport system to be used as fluidizing gas.

Several different take-off points are illustrated. It is contemplated that only one of these points is used, or any combination of them is used. Take-off point 381 is located downstream of the fan 386 and upstream of the stack 380. Take-off point 382 is located upstream of the circulating dry scrubber 360. Take-off point 383 is located between the circulating dry scrubber 360 and particle collection device 370. Take-off point 384 is located between the particle collection device 370 and the fan 386.

The recycle flue gas path 385 runs through a fan/blower 387 (to increase pressure) and through a heater 388 that is used to control the final temperature of the fluidizing gas fed to the solids transport system. The heater 388 and the fan/blower 387 can be located in any order. As depicted here, solid particles collected in the particle collection device 370 can fall into hoppers 392, which feed a fluidized slide 391 that sends solid particles to a distribution bin 390 (again, the distribution bin is optional). If the distribution bin is completely filled, causing a backlog of solid particles, the particles can be diverted into surge bin 389. Particles are then sent from the distribution bin 390 to the absorber vessel 360, completing the recycle path for the solid particles.

The flue gas recycle path 385 is used to provide fluidizing gas to fluidized surface(s) in the fluidized slide 391, the distribution bin 390, the fabric filter hoppers 392, and/or the surge bin 389. Solid particles can also be disposed (reference numeral 374).

Figure 6:
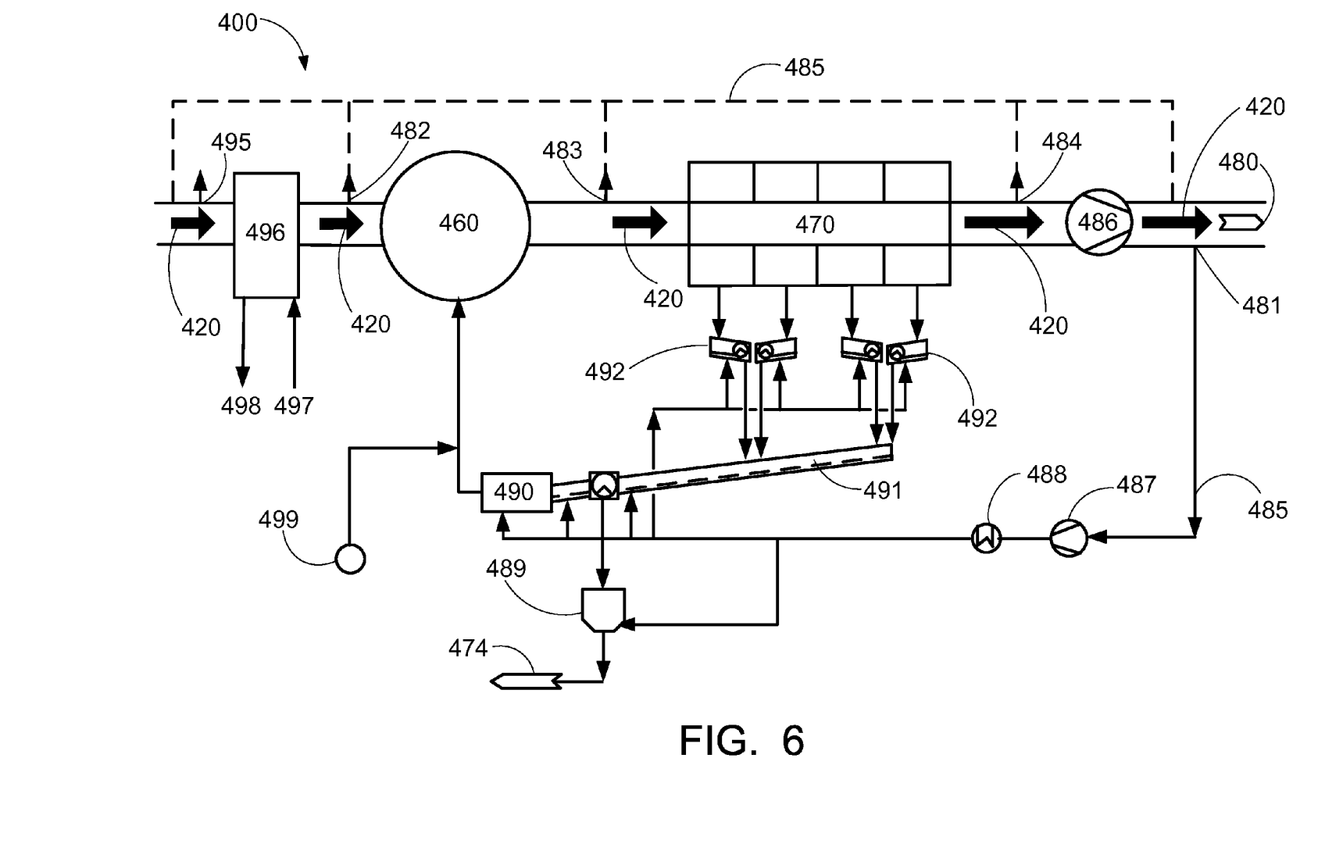
FIG. 6 is a second diagram illustrating other flow paths of the desulfurization system in a second exemplary embodiment of the present disclosure.

FIG. 6 is a schematic illustrating another flue gas desulfurization system 400 and its solids transport system. The system includes a main flue gas path 420 that has exited the boiler and extends through an air preheater 496, a circulating dry scrubber 460, a particle collection device 470, and to a stack 480 for discharge. A fan (e.g., an induced draft fan) 486 can also be located in the main flue gas path, for example downstream of the particle collection device 470 and upstream of the stack 480.

A recycle flue gas path 485 is also illustrated. A portion of the flue gas in the main flue gas path 420 is bled off at one or more take-off points 481, 482, 483, 484, 495 and is sent to the solids transport system to be used as fluidizing gas.

Several different take-off points are illustrated. It is contemplated that only one of these points is used, or any combination of them is used. Take-off point 495 is located upstream of the air heater 496 in the main flue gas path. Take-off point 481 is located downstream of the fan 486 and upstream of the stack 480. Take-off point 482 is located downstream of the air heater 496 and upstream of the circulating dry scrubber 460. Take-off point 483 is located between the circulating dry scrubber 460 and particle collection device 470. Take-off point 484 is located between the particle collection device 470 and the fan 486.

Cold combustion air 497 is heated in the air preheater 496 and absorbs energy from the flue gas 420 to provide hot combustion air 498 that is used for other purposes.

In particular embodiments, two or more take-off points are used. A mixture of two or more flue gas streams is blended together and used as the fluidizing gas. The relative amounts of the two or more flue gas streams may be selected to control one or more parameters of the fluidizing gas (e.g., temperature). For example, a first take-off point 382 could be located upstream of the dry scrubber 360 and a second take-off point 382 could be located downstream of the particle collection device 370. Again, any number or combination of the take-off points previously described could be used.

The recycle flue gas path 485 runs through a fan/blower 487 (to increase pressure) and through a heater 488 that is used to control the final temperature of the fluidizing gas fed to the solids transport system. In other embodiments, the heater 488 is located upstream of the fan/blower 487. As depicted here, solid particles collected in the particle collection device 470 can fall into hoppers 492, which feed a fluidized slide 491 that sends solid particles to an optional distribution bin 490. If the distribution bin is completely filled causing a backlog of solid particles, the particles can be diverted into surge bin 489. Particles are then sent from the distribution bin 490 to the absorber vessel 460, completing the recycle path for the solid particles.

The flue gas recycle path 485 is used to provide fluidizing gas to fluidized surface(s) in the fluidized slide 491, the distribution bin 490, the fabric filter hoppers 492 and/or the surge bin 489. Solid particles can also be disposed (reference numeral 474).

By replacing ambient air with hot flue gas for the fluidizing gas, the systems and methods of the present disclosure reduce the parasitic load of the solids transport system and reduce the power necessary to heat the fluidizing gas to an acceptable temperature (e.g., above the dew point of water). The capital cost of the heaters and associated electrical equipment is also reduced. It has been calculated in one example that by using hot flue gas instead of ambient air, the power of a given electric resistance heater can be reduced from 630 kW to 75 kW. When eight such heaters are used, the cumulative power savings is 4.44 MW.

It is contemplated that in particular embodiments, the recirculated flue gas may be blended with air (e.g., ambient air) to form the fluidizing gas. This is illustrated in FIG. 6, where the ambient air is labeled with reference numeral 499, and is mixed with the recycled flue gas prior to entering the absorber vessel 460. The fluidization gas may be filtered downstream of the take-off point either before or after the air is introduced. This blended mixture of flue gas and air may be especially suitable if the flue gas is recycled at take-off point 495, as this flue gas should have an increased temperature elevation above the water dew point compared to pure flue gas taken from downstream of the air heater.

The systems and methods of the present disclosure are also especially useful in oxy-combustion systems, which burn a fuel using pure oxygen instead of air (78% nitrogen, 21% oxygen). Such systems generally produce a flue gas consisting primarily of carbon dioxide and water. Using the hot flue gas to replace air injected through the fluidized slide conveyor(s) and/or fluidized pad(s) and/or other components in the solids transport system reduces air infiltration and/or minimizes air injection into the system, further concentrating carbon dioxide, thereby increasing the efficiency of the carbon dioxide compression system and eliminating some emissions.

The system may be an air-fired system or an oxy-fired system. In an oxycombustion system, the reduced air injection and infiltration reduces dilution of the $CO_2$-rich stream, thereby improving $CO_2$ compression efficiency. In some embodiments, the system is an oxy-fired system and the fluidizing gas is a mixture of recycled gases. In other embodiments, the system is an air-fired system and the fluidizing gas is a mixture of air and flue gas.

The particle collection device may in various embodiments be an electrostatic precipitator (ESP), a reverse gas fabric filter, a shake deflate fabric filter, or a pulse jet fabric filter. Desirably, the particle collection device is either a pulse jet fabric filter (PJFF) or a reverse gas fabric filter. In this regard, such fabric filters are preferable to an ESP due to the desulfurization ability of the fabric filter compared to an ESP. In other words, the fabric filter can capture pollutants that are in the vapor phase due to buildup of a filter cake, whereas an ESP only traps particles and does not significantly capture vapor-phase pollutants.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flue gas desulfurization system, comprising:
a main flue gas path that extends through an absorber vessel, a particle collection device downstream of the absorber vessel, and a stack;
a solids transport system for recycling solid alkaline particles from the particle collection device to the absorber vessel, the solids transport system including at least one fluidized surface, wherein the at least one fluidized surface is created using flue gas, or a combination of flue gas and fluidization air, such that the capacity of at least one air heater and/or at least fan/blower is reduced or is eliminated; and
a flue gas recycle path having at least one take-off point that sends flue gas from the main flue gas path to the solids transport system, the flue gas being used as a fluidizing gas to produce the at least one fluidized surface.

2. The system of claim 1, wherein the at least one take-off point is located upstream of the absorber vessel in the main flue gas path.

3. The system of claim 1, wherein the at least one take off point is located downstream of the absorber vessel and upstream of the particle collection device in the main flue gas path.

4. The system of claim 1, wherein the main flue gas path includes a fan downstream of the particle collection device and upstream of the stack.

5. The system of claim 4, wherein the at least one take-off point is located downstream of the particle collection device and upstream of the fan in the main flue gas path.

6. The system of claim 4, wherein the at least one take off point is located downstream of the fan and upstream of the stack in the main flue gas path.

7. The system of claim 1, wherein the main flue gas path includes an air preheater that is downstream of a boiler and upstream of the absorber vessel, and the at least one take-off point is located upstream of the air preheater.

8. The system of claim 1, wherein the solids transport system includes a slide leading from the particle collection device, the slide having the at least one fluidized surface.

9. The system of claim 1, wherein the solids transport system includes a distribution bin that receives recycled solid particles from the particle collection device, the wherein at least one fluidized surface being located in the distribution bin.

10. The system of claim 1, wherein the solids transport system includes a slide leading from the particle collection device to a distribution bin, the slide and the distribution bin each having a fluidized surface.

11. The system of claim 1, wherein the solids transport system includes a hopper, the hopper having a fluidized surface.

12. The system of claim 1, further comprising an air stream that is mixed with the flue gas recycle path so that a mixture of flue gas and air is used as the fluidizing gas.

13. The system of claim 1, wherein the flue gas recycle path has a plurality of take-off points.

14. A method for recycling solid particles in a flue gas desulfurization system that has a main flue gas path extending through an absorber vessel and a particle collection device downstream of the absorber vessel, comprising:
separating solid particles from clean gas in the particle collection device;

recycling solid alkaline particles from the particle collection device to the absorber vessel using a solids transport system that includes at least one fluidized surface, wherein the at least one fluidized surface is created using flue gas, or a combination of flue gas and fluidization air, such that the capacity of at least one air heater and/or at least fan/blower is reduced or is eliminated;

wherein recycled flue gas is sent from the main flue gas path to the solids transport system through a flue gas recycle path comprising at least one take-off point, and the recycled flue gas is used as a fluidizing gas to produce the at least one fluidized surface upon which the solid particles travel.

15. The method of claim 14, wherein the at least one take-off point is located upstream of the absorber vessel in the main flue gas path.

16. The method of claim 14, wherein the at least one take-off point is located downstream of the absorber vessel and upstream of the particle collection device in the main flue gas path.

17. The method of claim 14, wherein the main flue gas path includes a fan downstream of the particle collection device and upstream of a stack.

18. The method of claim 17, wherein the at least one take-off point is located downstream of the particle collection device and upstream of the fan in the main flue gas path.

19. The method of claim 17, wherein the at least one take-off point is located downstream of the fan and upstream of the stack in the main flue gas path.

20. The method of claim 14, wherein the solids transport system includes a slide leading from the particle collection device, or a distribution bin that receives recycled solid particles from the particle collection device, or a fluidized hopper, and wherein the at least one fluidized surface is located in the slide, the distribution bin, or the hopper.

21. The method of claim 14, further comprising the step of mixing the recycled flue gas with air to form a mixture of flue gas and air that is used as the fluidizing gas.

22. The method of claim 14, wherein the flue gas recycle path has a plurality of take-off paths.

23. A flue gas desulfurization system, comprising:
a main flue gas path that extends through a circulating dry scrubber absorber vessel, a particle collection device downstream of the absorber vessel, and a stack;
a solids transport system for recycling solid alkaline particles from the particle collection device to the circulating dry scrubber absorber vessel, the solids transport system including at least one fluidized surface, wherein the at least one fluidized surface is created using flue gas, or a combination of flue gas and fluidization air, such that the capacity of at least one air heater and/or at least fan/blower is reduced or is eliminated; and
a flue gas recycle path having at least one take-off point that sends flue gas from the main flue gas path to the solids transport system, the flue gas being used as a fluidizing gas to produce the at least one fluidized surface.

24. The system of claim 23, wherein the at least one take-off point is located upstream of the circulating dry scrubber absorber vessel in the main flue gas path.

25. The system of claim 23, wherein the at least one take-off point is located downstream of the circulating dry scrubber absorber vessel and upstream of the particle collection device in the main flue gas path.

26. The system of claim 23, wherein the main flue gas path includes a fan downstream of the particle collection device and upstream of the stack.

27. The system of claim 26, wherein the at least one take-off point is located downstream of the particle collection device and upstream of the fan in the main flue gas path.

28. The system of claim 26, wherein the at least one take-off point is located downstream of the fan and upstream of the stack in the main flue gas path.

29. The system of claim 23, wherein the main flue gas path includes an air preheater that is downstream of a boiler and upstream of the absorber vessel, and the at least one take-off point is located upstream of the air preheater.

30. The system of claim 23, wherein the solids transport system includes a slide leading from the particle collection device, the slide having the at least one fluidized surface.

31. The system of claim 23, wherein the solids transport system includes a distribution bin that receives recycled solid particles from the particle collection device, the at least one fluidized surface being located in distribution bin.

32. The system of claim 23, wherein the solids transport system includes a slide leading from the particle collection device to a distribution bin, the slide and the distribution bin each having a fluidized surface.

33. The system of claim 23, wherein the solids transport system includes a hopper, the hopper having a fluidized surface.

34. The system of claim 23, further comprising an air stream that is mixed with the flue gas recycle path so that a mixture of flue gas and air is used as the fluidizing gas.

35. The system of claim 23, wherein the flue gas recycle path has a plurality of take-off points.

* * * * *